(12) United States Patent
Morin

(10) Patent No.: US 9,981,703 B2
(45) Date of Patent: May 29, 2018

(54) TRACK SYSTEM

(71) Applicant: SOUCY INTERNATIONAL INC., Drummondville (CA)

(72) Inventor: Vincent Morin, Saint-Hyacinthe (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 305 days.

(21) Appl. No.: 14/516,072

(22) Filed: Oct. 16, 2014

(65) Prior Publication Data

US 2015/0136497 A1 May 21, 2015

Related U.S. Application Data

(60) Provisional application No. 61/891,528, filed on Oct. 16, 2013.

(51) Int. Cl.
| | | |
|---|---|---|
| *B62D 55/08* | (2006.01) | |
| *B62D 55/065* | (2006.01) | |
| *B62D 55/104* | (2006.01) | |
| *B62D 55/14* | (2006.01) | |
| *B62D 55/04* | (2006.01) | |
| *B62D 55/084* | (2006.01) | |
| *B62D 55/108* | (2006.01) | |
| *B62D 55/12* | (2006.01) | |
| *B62D 55/125* | (2006.01) | |

(52) U.S. Cl.
CPC .............. *B62D 55/08* (2013.01); *B62D 55/04* (2013.01); *B62D 55/065* (2013.01); *B62D 55/084* (2013.01); *B62D 55/104* (2013.01); *B62D 55/108* (2013.01); *B62D 55/12* (2013.01); *B62D 55/125* (2013.01); *B62D 55/14* (2013.01)

(58) Field of Classification Search
CPC ...... B62D 55/08; B62D 55/04; B62D 55/065; B62D 55/084; B62D 55/14
USPC .......................................................... 180/9.5
See application file for complete search history.

(56) References Cited

U.S. PATENT DOCUMENTS

| | | | | |
|---|---|---|---|---|
| 3,077,238 A | * | 2/1963 | Nelson ................... | B62M 27/02 180/192 |
| 3,318,403 A | * | 5/1967 | Hansen ................... | B62B 13/18 180/185 |
| 3,362,492 A | * | 1/1968 | Hansen ................... | B62K 13/00 180/185 |
| 3,412,820 A | * | 11/1968 | Wachholz .............. | B62K 13/00 180/185 |

(Continued)

*Primary Examiner* — Jacob D Knutson
*Assistant Examiner* — Michael R Stabley
(74) *Attorney, Agent, or Firm* — BCF LLP

(57) ABSTRACT

A track system for use as a wheel replacement on a vehicle comprises a first drive wheel configured to be mounted to the vehicle, a first frame pivotally yet non-drivingly mounted to the first drive wheel, a second frame mounted to the first frame, at least a second drive wheel pivotally mounted to the second frame, at least an idler wheel pivotally mounted to the second frame at a second extremity, and at least an endless traction band disposed about the second drive wheel and the idler wheel. The second drive wheel is configured to drivingly engage the traction band. The first drive wheel is operatively coupled to the second drive wheel via a transmission mechanism (e.g. a loop) such that rotation of the first drive wheel causes the rotation of the second drive wheel.

17 Claims, 18 Drawing Sheets

(56) References Cited

U.S. PATENT DOCUMENTS

| | | | | |
|---|---|---|---|---|
| 3,412,821 A * | 11/1968 | Humphrey | B62D 55/04 | 180/185 |
| 3,439,763 A * | 4/1969 | Pederson | B62D 55/02 | 180/9.21 |
| 3,667,562 A * | 6/1972 | Compton | B62K 13/00 | 180/184 |
| 3,822,755 A * | 7/1974 | Hine | B62B 13/18 | 180/185 |
| 4,437,534 A * | 3/1984 | Grinde | B62M 27/02 | 180/190 |
| 4,823,903 A * | 4/1989 | Bibollet | B62K 17/00 | 180/193 |
| 4,917,207 A * | 4/1990 | Yasui | B62M 27/02 | 180/193 |
| 5,474,146 A * | 12/1995 | Yoshioka | B62K 13/00 | 180/184 |
| 6,095,275 A * | 8/2000 | Shaw | B62K 13/00 | 180/185 |
| 6,112,840 A * | 9/2000 | Forbes | B62K 3/002 | 180/191 |
| 6,302,232 B1 * | 10/2001 | Forbes | B62K 3/002 | 180/191 |
| 6,321,864 B1 * | 11/2001 | Forbes | B62D 55/07 | 180/190 |
| 6,431,301 B1 * | 8/2002 | Forbes | B62K 3/002 | 180/185 |
| 6,708,791 B2 * | 3/2004 | Alexander | B62M 27/02 | 180/182 |
| 6,874,586 B2 * | 4/2005 | Boivin | B62D 55/04 | 180/9.26 |
| 7,040,426 B1 * | 5/2006 | Berg | B62D 55/02 | 180/9.5 |
| 7,182,165 B1 * | 2/2007 | Keinath | B62M 27/02 | 180/185 |
| 7,357,201 B2 * | 4/2008 | Jordan | B62D 55/04 | 180/9.26 |
| 7,497,530 B2 * | 3/2009 | Bessette | B62D 55/04 | 305/128 |
| 7,673,711 B1 * | 3/2010 | Berg | B62D 55/02 | 180/9.21 |
| 7,712,557 B2 * | 5/2010 | Duceppe | B62D 15/00 | 180/9.21 |
| 7,789,183 B2 * | 9/2010 | Sadakuni | B62D 55/07 | 180/190 |
| 7,870,914 B2 * | 1/2011 | Todd | B62D 55/04 | 180/185 |
| 8,056,656 B2 * | 11/2011 | Todd | B62D 55/04 | 180/9.1 |
| 8,347,991 B2 * | 1/2013 | Zuchoski | B62D 55/10 | 180/9.1 |
| 9,211,921 B2 * | 12/2015 | Zuchoski | B62D 55/084 | |
| 2003/0159860 A1 * | 8/2003 | Boivin | B62D 55/04 | 180/9.26 |
| 2006/0060395 A1 * | 3/2006 | Boivin | B62D 11/08 | 180/9.21 |
| 2012/0104840 A1 * | 5/2012 | Zuchoski | B62D 55/084 | 305/100 |

* cited by examiner

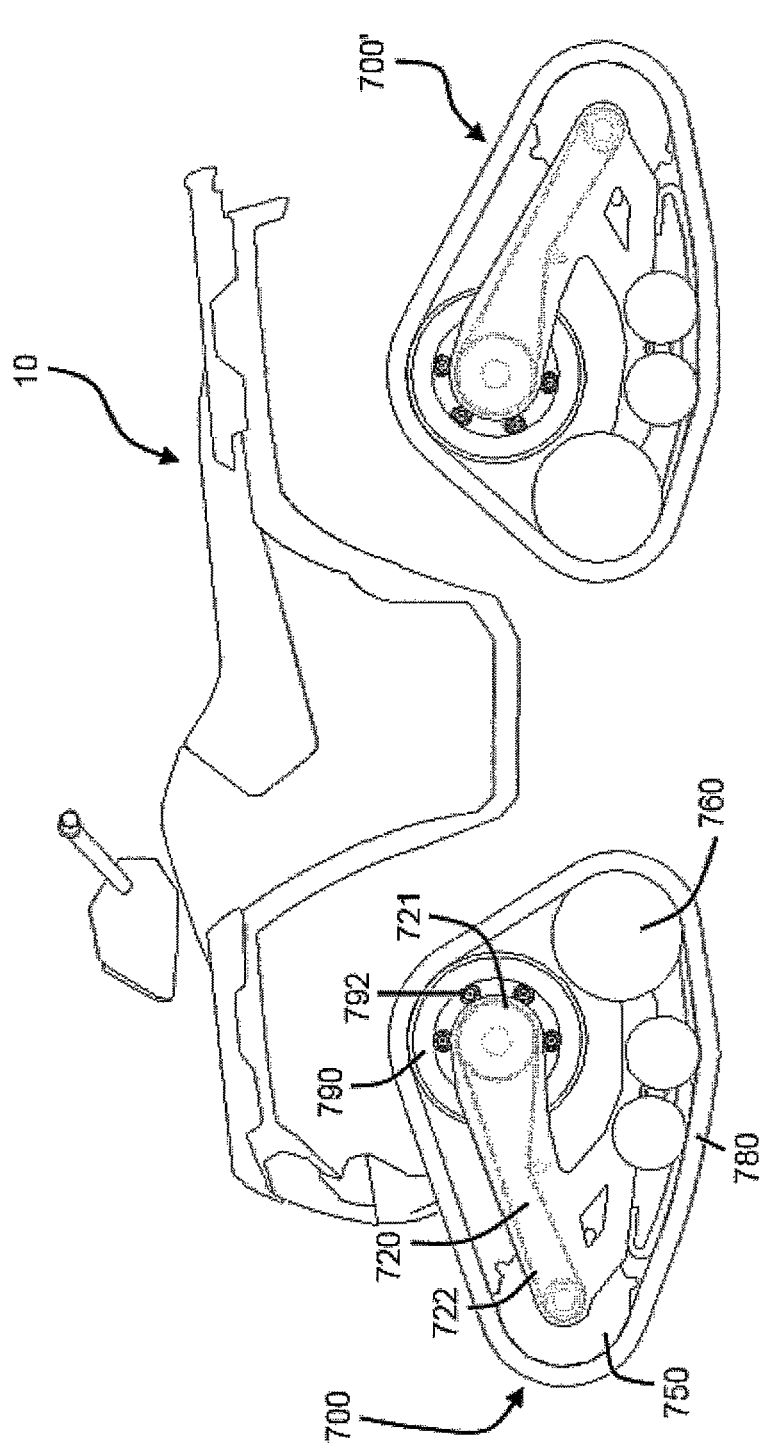

US 9,981,703 B2

TRACK SYSTEM

CROSS-REFERENCE TO RELATED APPLICATIONS

The present patent application claims the benefits of priority of the U.S. Provisional Application No. 61/891,528, entitled "TRACK SYSTEM" and filed at the United States Patent and Trademark Office on Oct. 16, 2013, the content of which is incorporated herein by reference.

FIELD OF THE INVENTION

The present invention generally relates to track systems and traction assemblies used as wheel replacement for normally wheeled vehicles. More particularly, the present invention relates to track systems and traction assemblies for use on light normally wheeled vehicles such as, but not limited to, all-terrain vehicles (ATVs), utility-terrain vehicles (UTVs) and side-by-side vehicles (SSVs).

BACKGROUND OF THE INVENTION

Several normally wheeled vehicles and particularly light wheeled vehicles (e.g. ATVs, UTVs, SSVs, etc.) often have their wheels replaced by track systems which use an endless traction band instead of a tire for propulsion. Vehicles equipped with such track systems typically have improved floatation and better traction, particularly when they are operated over soft and/or rough terrains.

Over the years, most track systems used on light vehicles have come to have the same overall configuration. These track systems all have a drive wheel (e.g. a sprocket wheel) configured to be mounted to the wheel hub where the vehicle wheel was previously mounted, a support frame mounted either to the sprocket wheel or to the vehicle, front and rear idler wheels respectively mounted at the front and rear extremities of the support frame, road wheels mounted along the length of the support frame, and an endless traction band disposed about the sprocket wheel, the idler wheels and the road wheels.

This typical configuration of track systems generally defines a triangular-shaped envelop in which the drive wheel and the idler wheels define the three apices between which extends the traction band. Though this configuration of track systems has generally provided satisfactory results, it remains that it has at least two main shortcomings.

First, in such configuration, only the portion of the traction band that extends along the ground between the front and rear idler wheels (also referred to as the lower run of the traction band) actually contribute to propelling the vehicle. Indeed, only the lower run of the traction band is, at any moment, in contact with the ground surface. Though the remaining portion of the traction band (also referred to as the upper run of the traction band) is necessary for power transmission purpose, it only passively contributes to propelling the vehicle.

Understandably, this upper run of the traction band has a non-negligible mass that must be continuously driven to transmit power from the drive wheel to the lower run of the traction band. This, in turn, consumes valuable power.

Second, this configuration of track systems must generally be limited in size in order for the track system to fit on the vehicle while avoiding contacts with the frame and other components of the vehicle. In turn, this size limitation limits the size of the various components of the track systems, and more particularly limits the size of the drive wheel.

In that sense, it is to be understood that the size of the drive wheel ultimately affects the top speed of the vehicle. The smaller the drive wheel is with respect to the wheel it replaces, the lower the top speed of the vehicle will generally be. Though having a small drive wheel is not necessarily a problem when the vehicle is operated at low speed on rough terrains, having a small drive wheel can become problematic when the vehicle is operated at higher speeds on smoother terrains. In that sense, it is not uncommon nowadays to find vehicles equipped with track systems to be operated on relatively firm and even terrains such as trails or even paved roads.

There have been attempts to overcome or at least circumvent the traditional triangular configuration of track systems.

For instance, U.S. Pat. No. 6,874,586 discloses a track system in which the size of the drive wheel has been increased such as to contact the lower run of the traction band. Though such a track system has partially overcome the problem of top speed, it has done so at the expense of comfort since all the unevenness of the terrain will be directly transmitted to the drive wheel and thus to the vehicle and its operator. Also, the track system of U.S. Pat. No. 6,874,586 does not address the problem of the excess length of the upper run of the traction band.

For its part, U.S. Patent Application Publication No. 2006/0060395 discloses a track system in which the traction band does not wrap around the drive wheel. This track system thus uses a shorter traction band since it extends only between the idler wheels. However, the traction band is driven via its outer surface by multiple gears which are all mounted to the same frame, making the track systems less adaptable over uneven terrains.

Hence, there is a need for an improved track system which will mitigate at least some shortcomings of prior art track systems.

SUMMARY OF THE INVENTION

The shortcomings of prior art track systems are at least mitigated by a track system which uses a pair of mechanically coupled drive wheels to drive the traction band, and in which the traction band only wraps around one of the two drive wheels.

Hence, a track system in accordance with the principles of the present invention generally comprises a first drive wheel (or first drive wheel assembly) configured to be mounted to the vehicle, a first frame pivotally yet non-drivingly mounted to the first drive wheel, a second frame mounted to the first frame, at least a second drive wheel (or second drive wheel assembly) pivotally mounted to the second frame, at least an idler wheel pivotally mounted to the second frame, and an endless traction band disposed around the second drive wheel and the idler wheel.

The track system also typically comprises road wheels pivotally mounted to the second frame along its length.

In accordance with the principles of the present invention, the first and second drive wheels are further drivingly coupled together via a transmission mechanism such that rotation of the first drive wheel will cause the rotation of the second drive wheel.

The second frame can be either fixedly mounted or pivotally mounted to the first frame. When the second frame is fixedly mounted to the first frame, the two frames act as a single frame assembly which axis of rotation is the same as the axis of rotation of the first drive wheel.

When the second frame is pivotally mounted to the first frame, the second frame can pivot with respect to the first frame. However, to prevent the first frame from collapsing onto the second frame, the track system generally comprises additional structure(s) between the first and second frames.

In typical yet non-limitative embodiments, these additional structures comprise a shock absorber extending between the first and second frames. In such embodiments, in addition to providing structural integrity to the track system, the shock absorber allows the track system to absorb some unevenness of the terrain over which it is operated.

In typical yet non-limitative embodiments, the first drive wheel comprises a first drive gear and the second drive wheel comprises a second drive gear. In such embodiments, the transmission mechanism between the first and second drive gears is an endless transmission loop (e.g. a chain, a belt, etc.).

When a transmission chain or belt is used to couple the first drive gear to the second drive gear, the number of teeth of the first and second drive gears can be selected such that the top speed of the vehicle with the track system is either the same or different (e.g. faster or slower) as the top speed of the vehicle with wheels.

In use, the first drive wheel is generally configured to be mounted to the wheel hub of the vehicle. As the first drive wheel is driven by the axle of the vehicle, the first drive wheel drives the second drive wheel via the transmission mechanism. For its part, the second drive wheel drives the traction band which propels the vehicle over the terrain over which it is operated.

Understandably, by using two drive wheels coupled by a transmission mechanism, a track system in accordance with the principles of the present invention generally needs a shorter traction band as the traction band does not need to wrap around the first drive wheel. Also, by using two drive wheels, a track system in accordance with the principles of the present invention generally provides the possibility to adjust the top speed of the vehicle equipped with such track systems without the need for a large vehicle-mounted drive wheel.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 18 is a schematic side view of an exemplary vehicle shown with two track systems according to yet another embodiment in accordance with the principles of the present invention in which the first and second portion of the frame are embodied in a single frame and a guiding wheel is mounted at the top extremity of the frame.

DETAILED DESCRIPTION OF THE PREFERRED EMBODIMENT

A novel track system will be described hereinafter. Although the invention is described in terms of specific illustrative embodiments, it is to be understood that the embodiments described herein are by way of example only and that the scope of the invention is not intended to be limited thereby.

Figure 1:
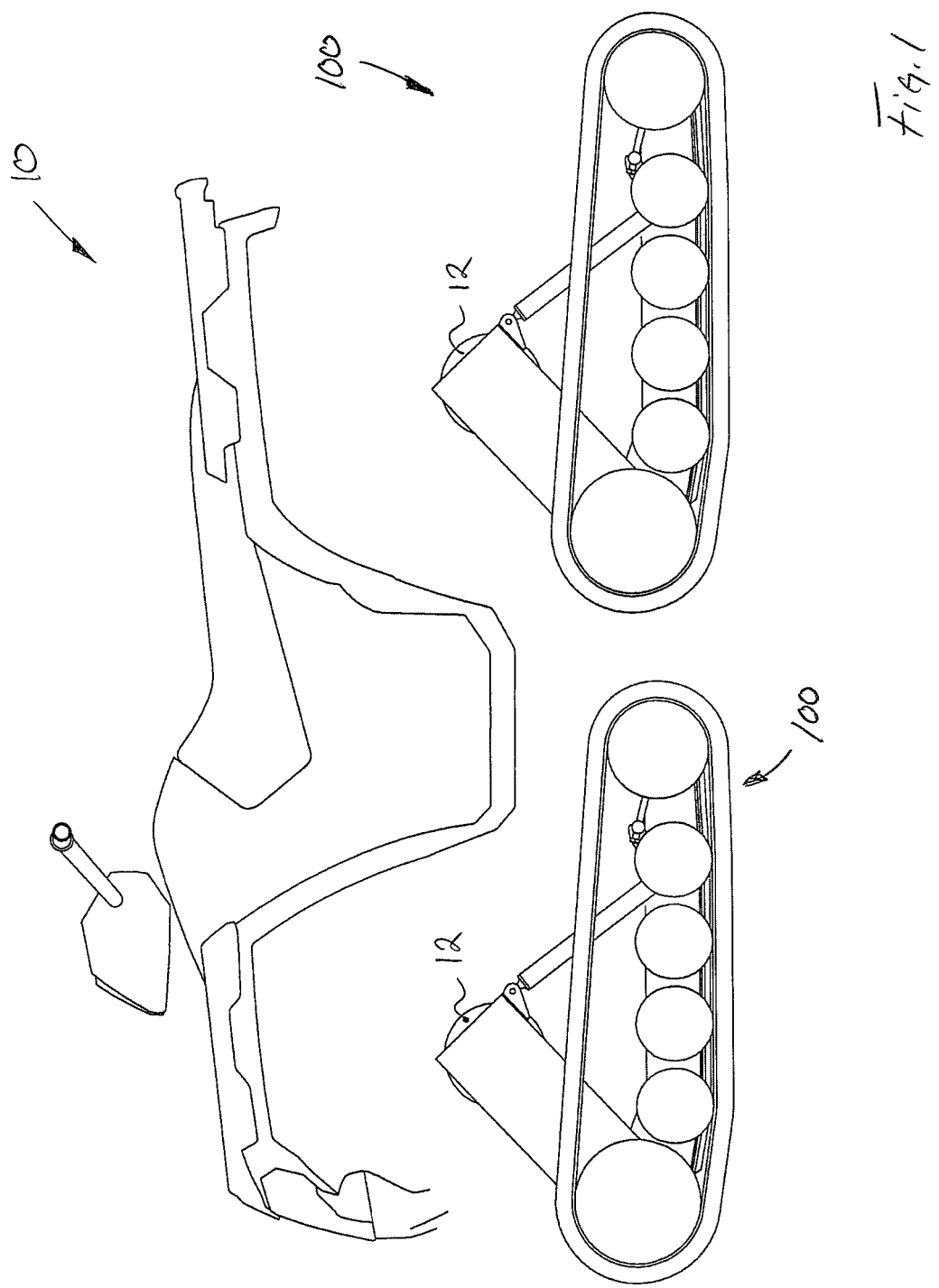
FIG. 1 is a schematic side view of an exemplary vehicle equipped with four track systems in accordance with the principles of the present invention.

Referring first to FIG. 1, a vehicle 10 is shown equipped with four track systems 100 (only the left ones are shown) mounted in replacement of wheels (not shown). In FIG. 1, the vehicle 10 is an all-terrain vehicle (ATV). Still, the track systems 100 could be mounted to other types of vehicles such as, but not limited to, utility-terrain vehicles (UTV), side-by-side vehicles (SSV), and other similar vehicles.

In FIG. 1, the front and rear track systems 100 are substantially identical track systems 100. However, in other embodiments, the front and rear track systems 100 could be of different configurations.

The track systems 100 generally allow the vehicle 10 to operate over uneven and/or soft terrains. Over such terrains, the track systems 100 generally improve floatation and traction.

Referring now to FIGS. 2 to 11, one of the track systems 100 is shown in greater details.

Figure 3:
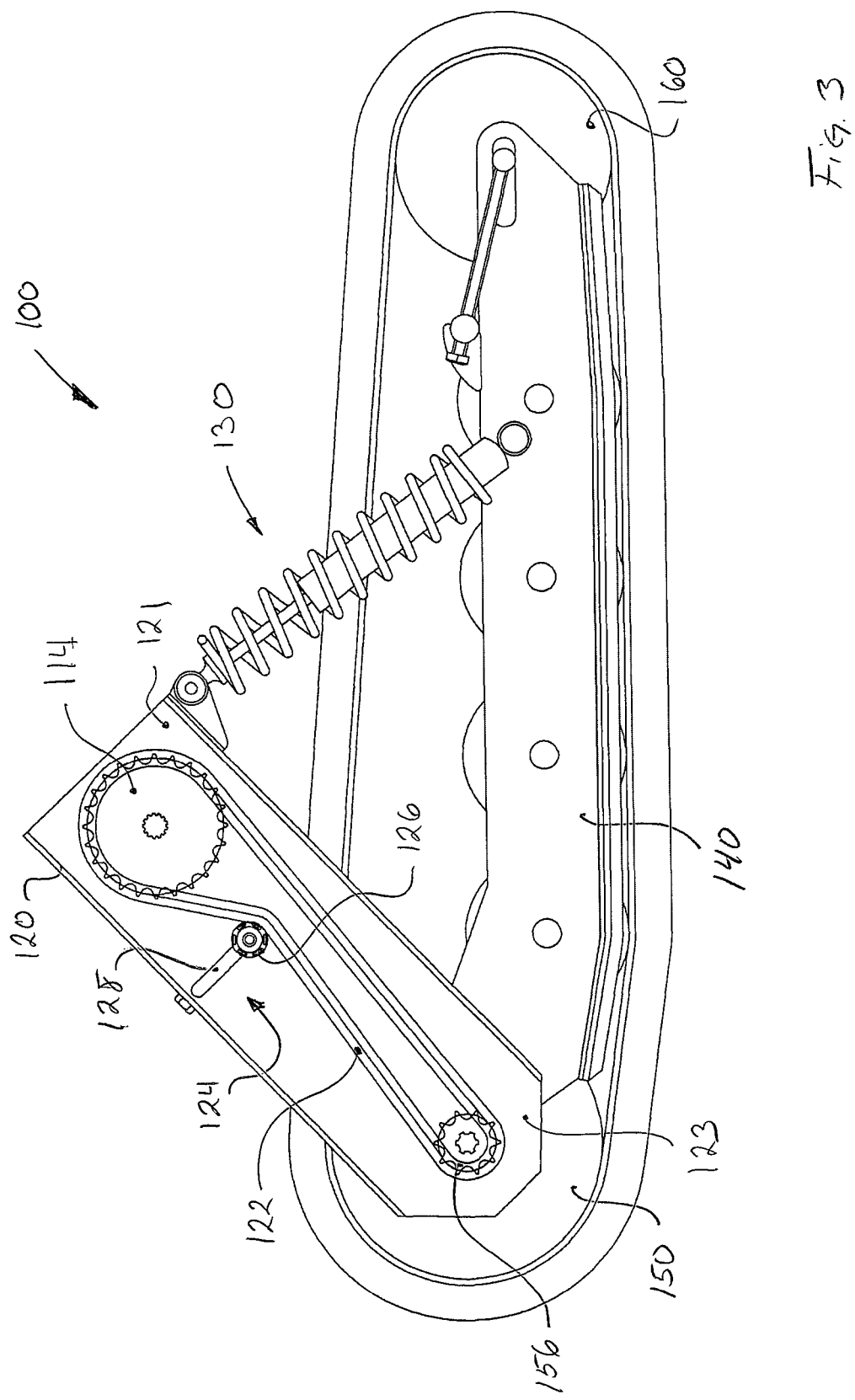
FIG. 3 is a schematic cross-sectional side view of the track system of FIG. 2.
Figure 4:
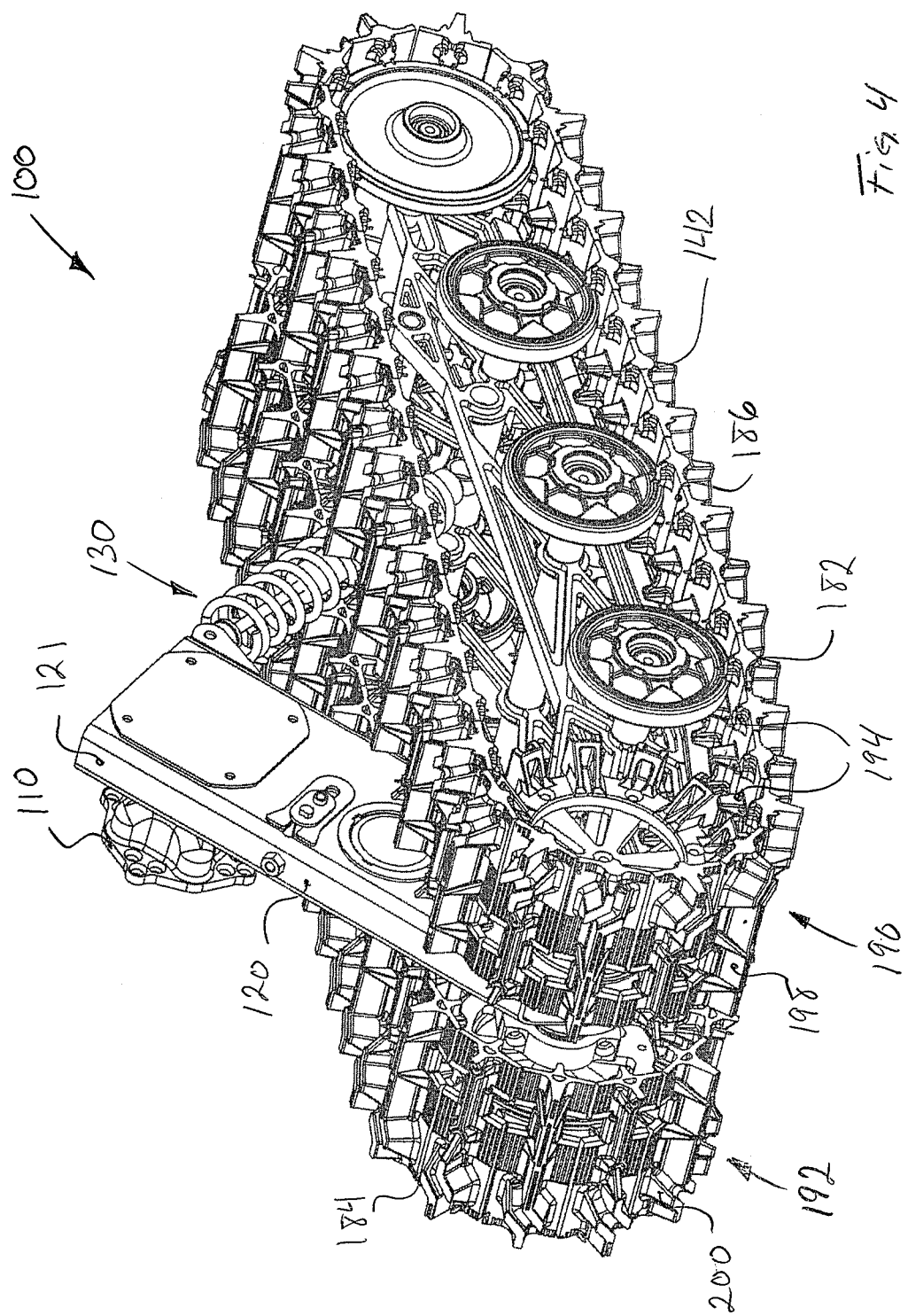
FIG. 4 is an outer perspective view of the track system of FIG. 2.
Figure 5:
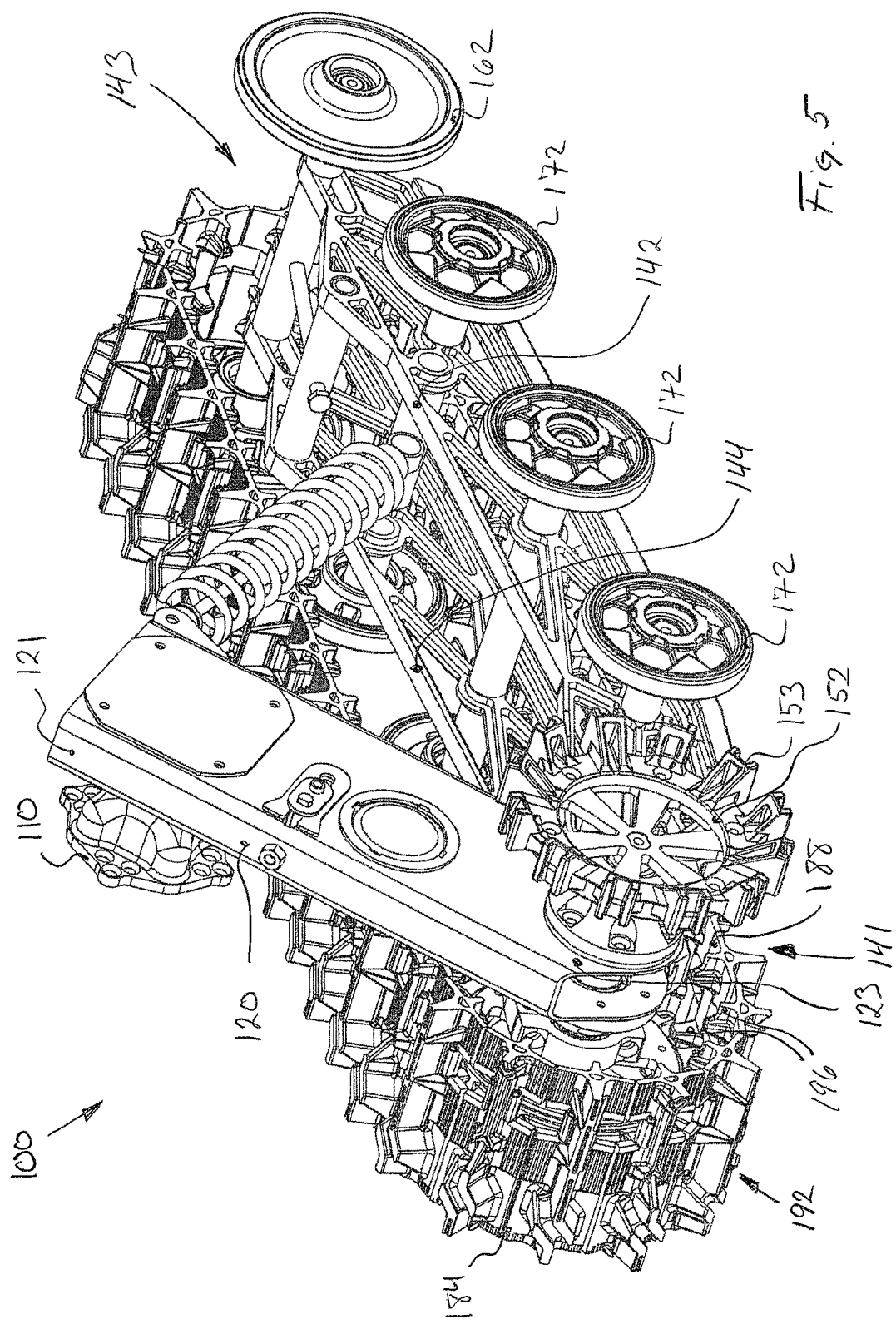
FIG. 5 is an outer perspective view of the track system of FIG. 2, without the outer traction band.
Figure 6:
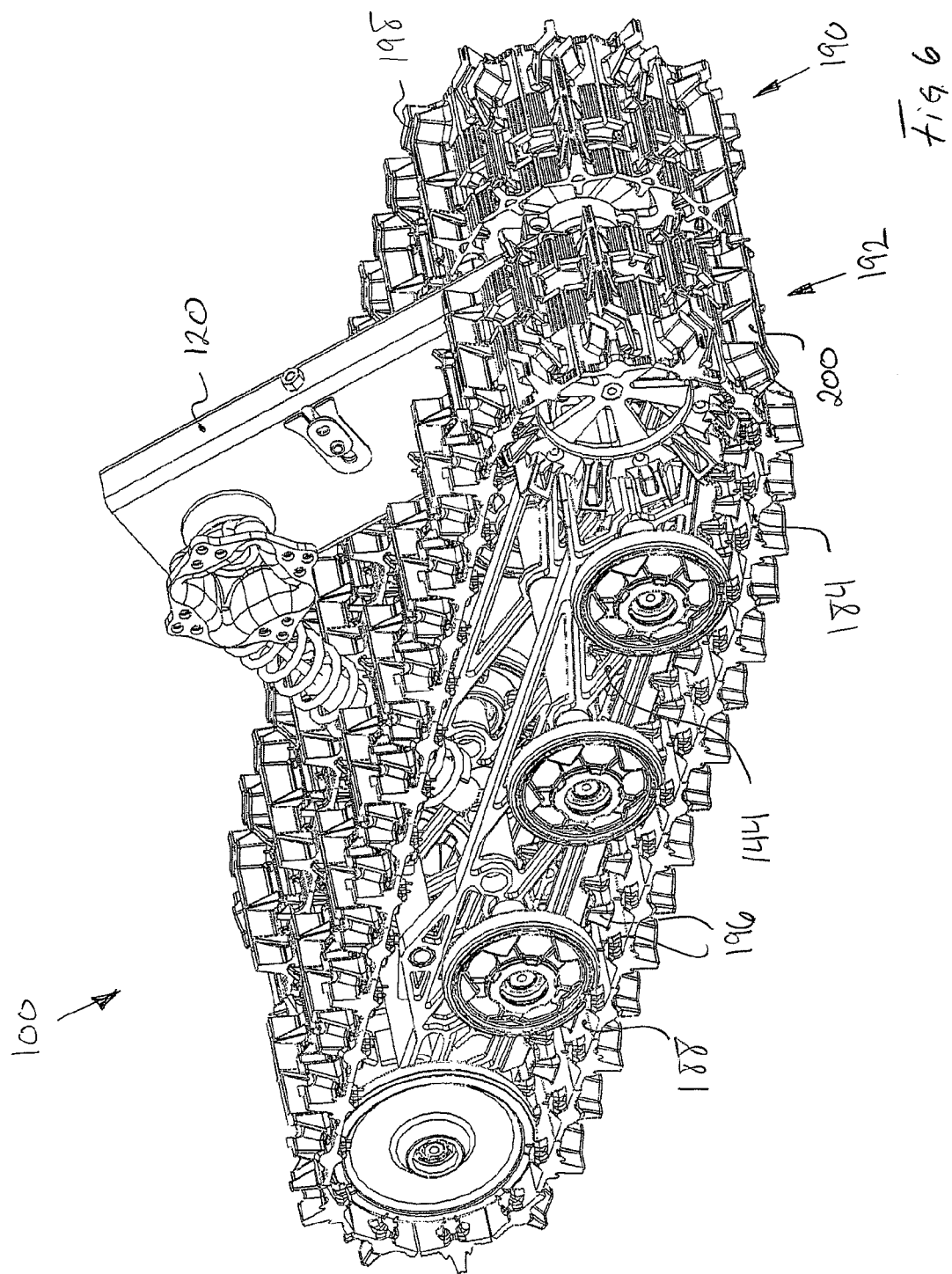
FIG. 6 is an inner perspective view of the track system of FIG. 2.
Figure 7:
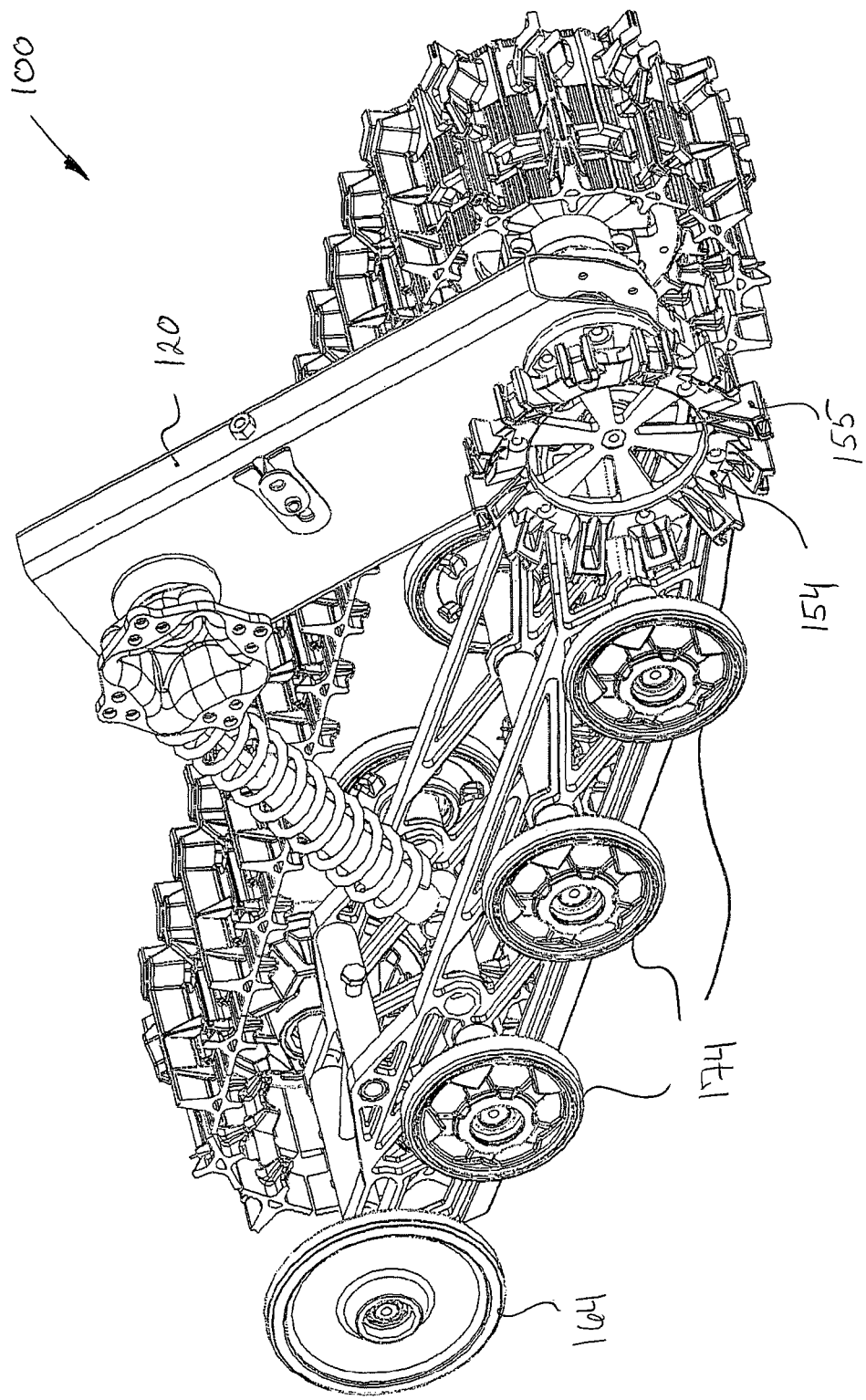
FIG. 7 is an inner perspective view of the track system of FIG. 2, without the inner traction band.
Figure 8:
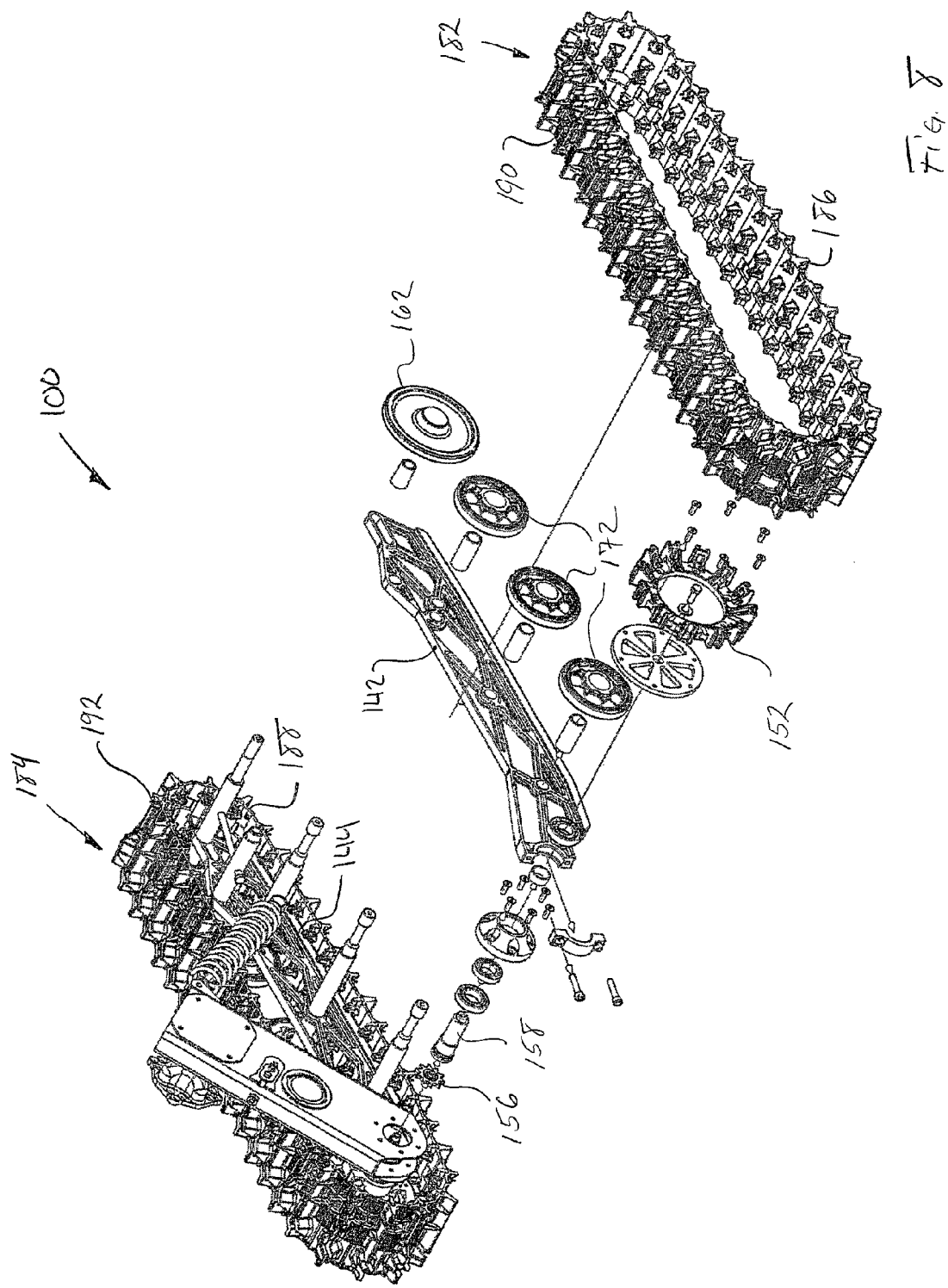
FIG. 8 is a partially exploded outer perspective view of the track system of FIG. 2.
Figure 9:
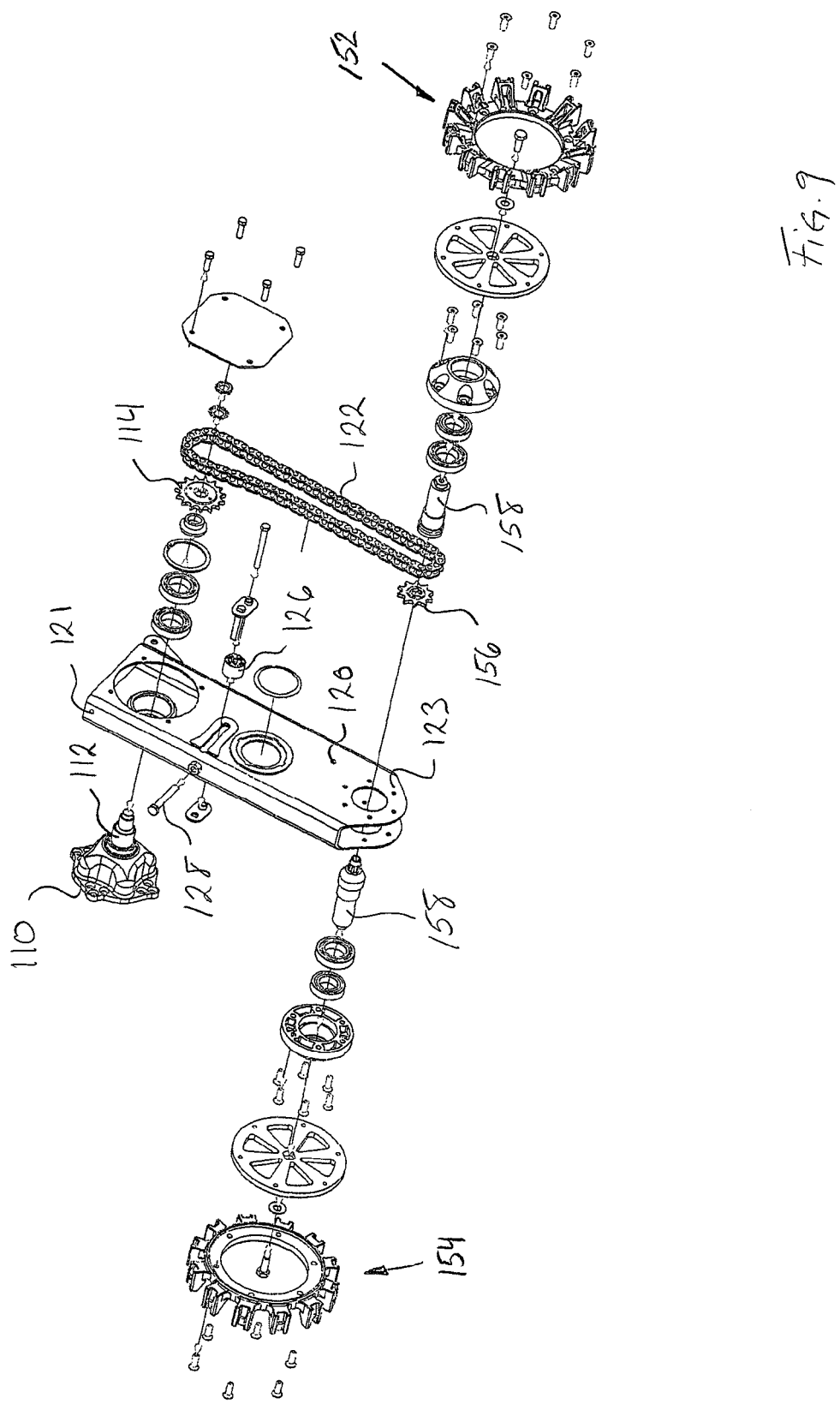
FIG. 9 is an exploded perspective view of the first drive wheel, the first frame and the second drive wheel of the track system of FIG. 2.
Figure 10:
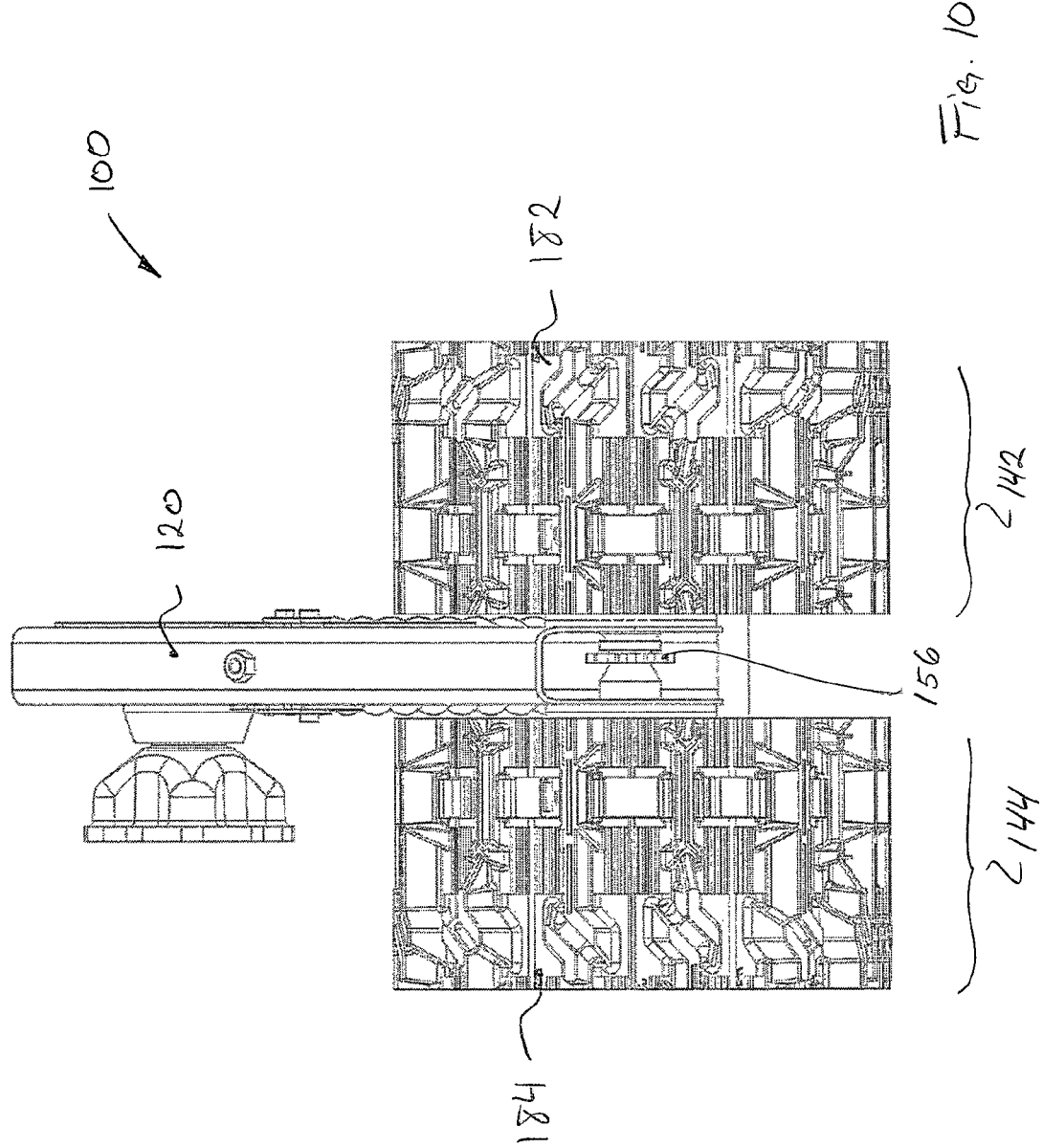
FIG. 10 is a front view of the track system of FIG. 2.
Figure 11:
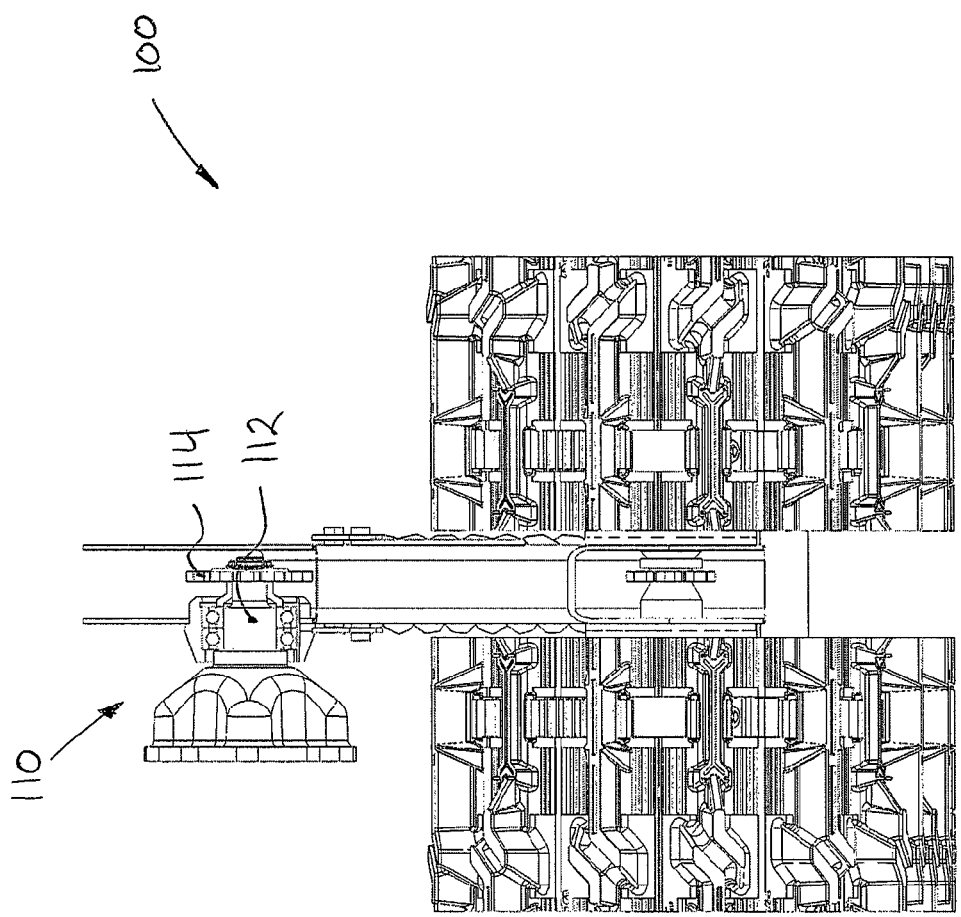
FIG. 11 is a front view of the track system of FIG. 2, with the upper portion of the first frame partially removed.

In the present embodiment, the track system 100 generally comprises a first drive wheel (or first drive wheel assembly) 110 which is configured to be mounted to the vehicle 10, typically to a wheel hub 12 thereof (see FIG. 1) and be driven (e.g. rotated) by it. The first drive wheel 110 further comprises a laterally extending shaft 112 (see FIGS. 9 and 11) to which is fixedly yet typically removably mounted a first drive gear 114. Understandably, rotation of the first drive wheel 110 will cause the rotation of the first drive gear 114. As best shown in FIG. 3, the first drive gear 114 is configured to drivingly engage a transmission loop 122 (e.g. a chain, a belt, etc.).

The track system 100 also comprises a first frame 120 (or a drive frame) having a first extremity 121 which is pivotally yet non-drivingly mounted to the first drive wheel 110, typically to the shaft 112 thereof, and a second extremity 123 mounted to a second frame 140 (or a carriage frame), typically, but not necessarily, at one of its extremities 141 and 143.

Figure 12:
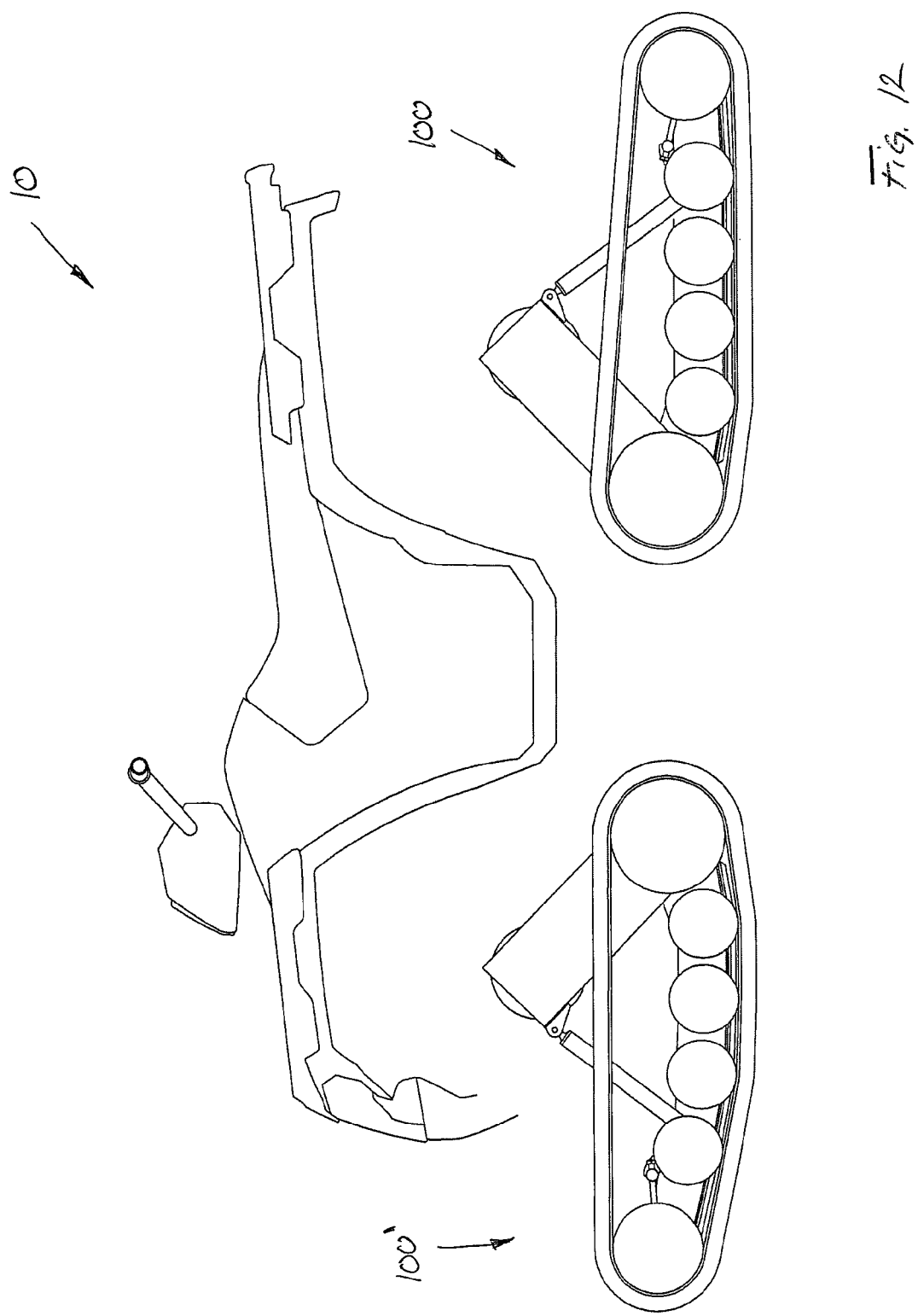
FIG. 12 is a schematic side view of an exemplary vehicle equipped with four track systems in accordance with the principles of the present invention, the track systems being mounted in a different configuration.

In the present embodiment, as best shown in FIGS. 2 to 9, the first frame 120 extends downwardly and forwardly such that its second extremity 123 is mounted at the front extremity 141 of the second frame 140. However, in other embodiments, the first frame 120 could extend downwardly and rearwardly such that its second extremity 123 would be mounted at the rear extremity 143 of the second frame 140 (see the front track systems 100' in FIG. 12). In still other embodiments, the first frame could extend downwardly such as to be connected to the second frame at a point along its length (see FIG. 16).

As best shown in FIGS. 4 to 11, in the present embodiment, the first frame 120 is mounted to the second frame 140 in a middle portion thereof with respect to its width. Hence, in the present embodiment, the second frame 140 generally comprises an outer or outboard portion 142 and an inner or inboard portion 144, the outer or outboard and the inner or inboard locations being defined with respect to the first frame 120 (see FIG. 10).

Figure 13:
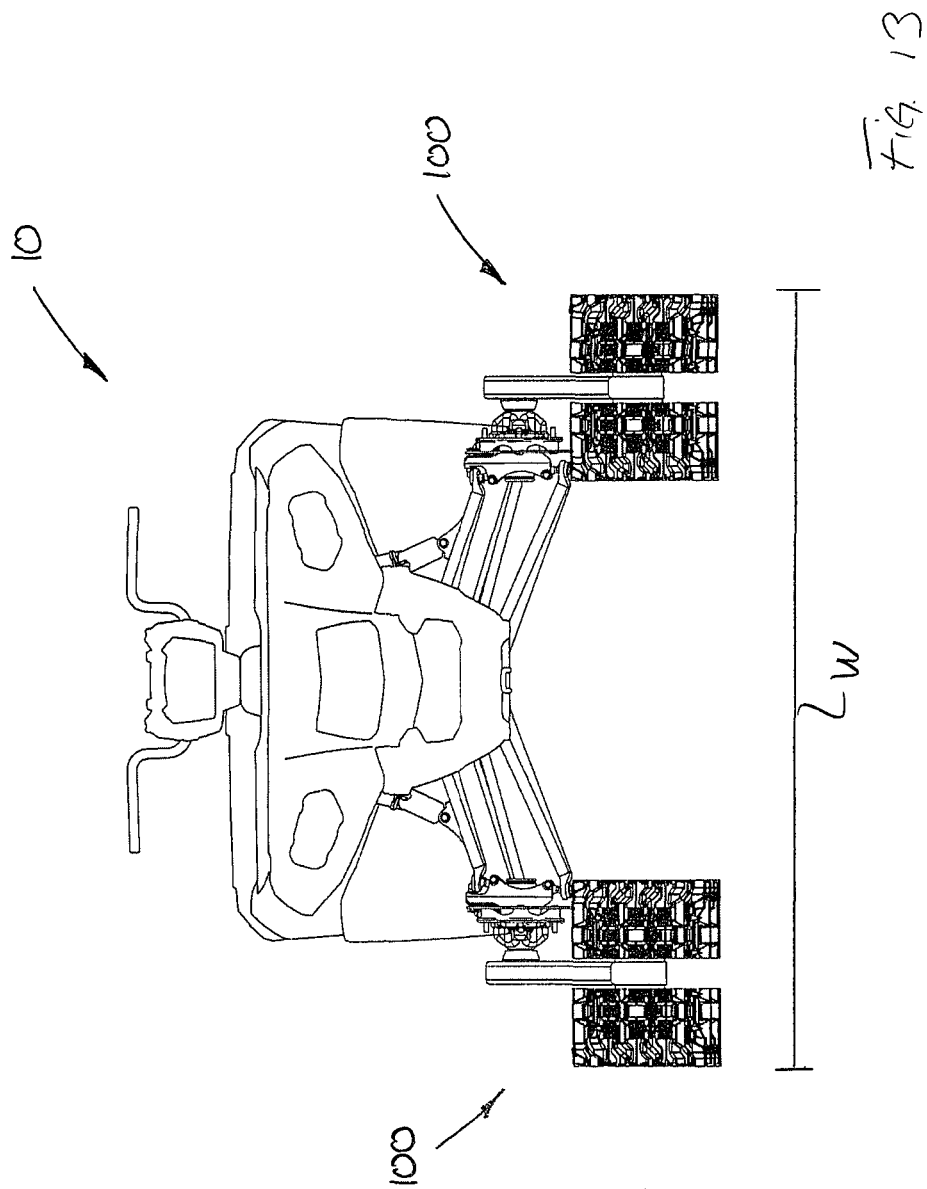
FIG. 13 is a front view of an exemplary vehicle shown with two track systems according to the embodiment of FIG. 2.
Figure 14:
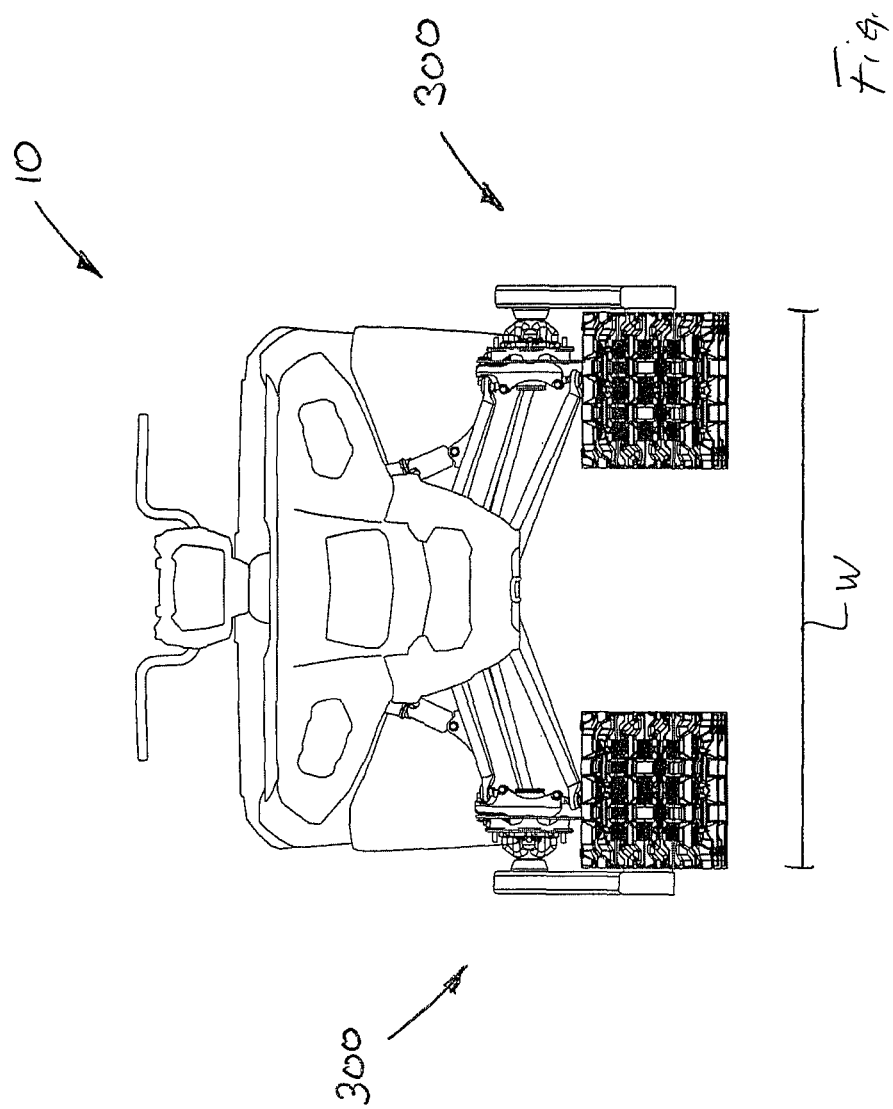
FIG. 14 is a front view of an exemplary vehicle shown with two track systems according to another embodiment in which the second frame is located completely inboard of the first frame.
Figure 15:
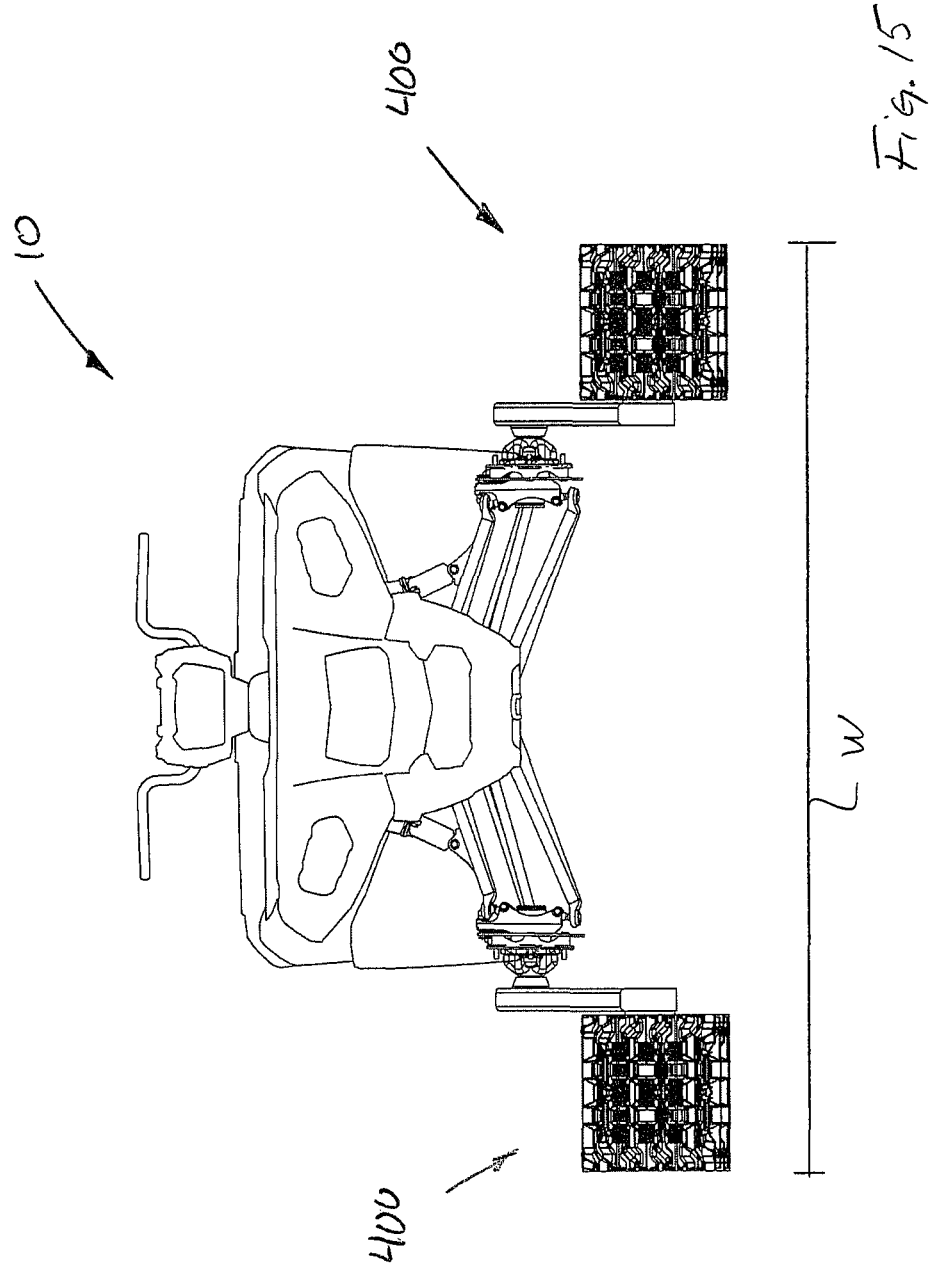
FIG. 15 is a front view of an exemplary vehicle shown with two track systems according to yet another embodiment in which the second frame is located completely outboard of the first frame.

Notably, in other embodiments, the first frame 120 could be mounted to the second frame 140 such the second frame 140 would be mounted either on the inner or inboard side of the first frame 120 or on the outer or outboard side of the first frame 120 (see embodiments 300 and 400 in FIGS. 14 and 15). Generally, the mounting location of the first frame 120 on the second frame 140 will affect the overall width W of the vehicle 10 (see FIGS. 13 to 15).

In the present embodiment, the first and second frames 120 and 140 are pivotally mounted together such that the second frame 140 can move (e.g. pivot) with respect to the first frame 120. However, to prevent the first and second frames 120 and 140 from collapsing, the track system 100 further comprises a shock absorber 130 pivotally mounted to and extending between the first and second frames 120 and 140.

The combination of the pivotal connection between the first and second frames 120 and 140 with the shock absorber 130 allows the track system 100 to absorb some shocks and generally follow the unevenness of the terrain over which the vehicle 10 is operated.

In other embodiments, the first and seconds frames 120 and 140 could be fixedly mounted together. In such embodiments, there would be no shock absorber 130. However, such embodiments could possibly be provided with additional structural elements (e.g. a third frame, a member, etc.) extending between the first and second frame 120 and 140 to provide additional support, if necessary.

As mentioned above, the second frame 140 has a first extremity 141 and a second extremity 143. In the present embodiment, the second frame 140 support second drive wheels (or second drive wheel assembly) 150 pivotally mounted at the first extremity 141, idler wheels 160 pivotally mounted at the second extremity 143, and road wheels 170 (or support wheels) pivotally mounted to the second frame 140 along its length.

In the present embodiment, since the second frame 140 comprises an outer portion 142 and an inner portion 144, the second drive wheels 150, the idler wheels 160 and the road wheels 170 also respectively comprise outer and inner second drive wheels 152 and 154, outer and inner idler wheels 162 and 164, and outer and inner road wheels 172 and 174.

The track system 100 also comprises a traction band 180 disposed around the second drive wheels 150, the idler wheels 160 and the road wheels 170. Again, in the present embodiment, since the second frame 140 is partitioned into an outer portion 142 and an inner portion 144, the traction band 180 effectively comprises two distinct traction bands, an outer traction band 182 and an inner traction band 184.

The outer traction band 182 is disposed about the outer second drive wheel 152, the outer idler wheel 162 and the outer road wheels 172. Similarly, the inner traction band 184 is disposed about the inner second drive wheel 154, the inner idler wheel 164 and the inner road wheels 174.

Understandably, in embodiments where the second frame 140 would be mounted on the outer side of the first frame 120 or on the inner side of the first frame 120, there would be only one traction band 180 (see FIGS. 14 and 15).

The traction bands 182 and 184 are configured to be respectively driven by the second drive wheels 152 and 154 and to engage the ground over which the vehicle 10 is operated. In that sense, the traction bands 182 and 184 respectively comprise an inner wheel-engaging surface 186 and 188, and an outer ground-engaging surface 190 and 192.

In the present embodiment, the inner wheel-engaging surfaces 186 and 188 each respectively comprise drive lugs and guide lugs collectively referred to as inner lugs 194 and 196. The drive lugs are configured to be engaged by the radial teeth 153 and 155 of the second drive wheels 152 and 154 respectively. For their part, the guide lugs generally guide the traction bands is they travel around the various wheels the track system 100.

The outer ground-engaging surface 190 and 192 of the traction bands 182 and 184 are configure to engage the ground surface over which the vehicle 10 is operated. In that sense, the outer ground-engaging surface 190 and 192 each comprise a pattern of traction lugs 198 and 200. The exact shapes and patterns of the traction lugs 198 and 200 can vary depending on the type of surface over which the vehicle 10 is to be operated.

Figure 2:
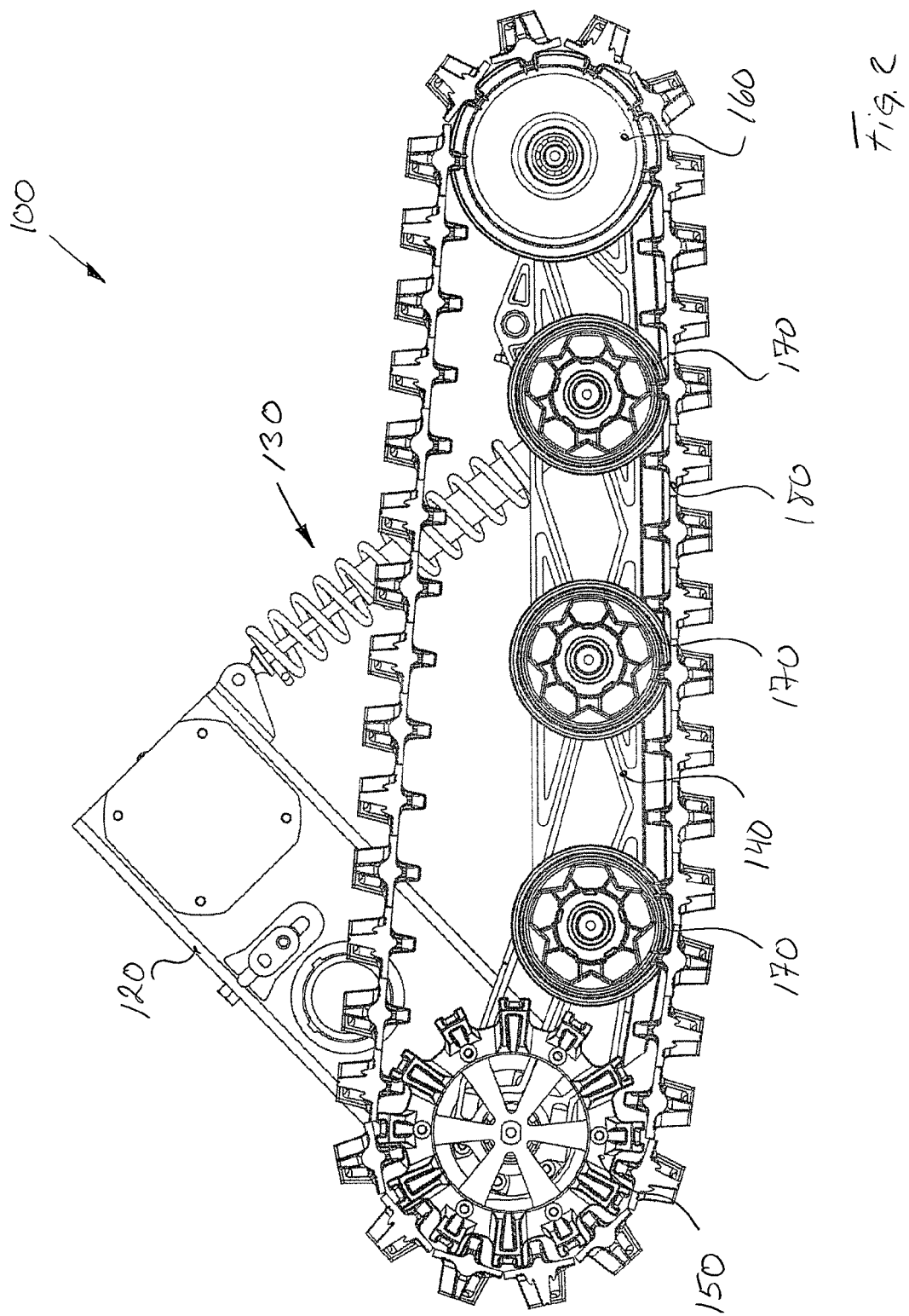
FIG. 2 is a side view of an embodiment of a track system in accordance with the principles of the present invention.

As best shown in FIGS. 1 and 2, the traction bands 182 and 184 do not wrap around the first drive wheel 110. Hence, the traction bands 182 and 184 do not exhibit a triangular perimeter.

In that sense, it is important to note that the perimeter defined by the traction bands 182 and 184 will not change even if the second frame 140 pivots with respect to the first frame 120. Indeed, the perimeter defined by the traction bands 182 and 184 is generally defined by the shape of the second frame 140 and by the position and size of the wheels 150, 160 and 170. However, the shape of the second frame 140 and the position and size of the wheels 150, 160 and 170 do not change during operation of the track system 100.

Hence, the frame structure of the track system 100, that is the structure formed by the first frame 120, the second frame 140 and the shock absorber 130, can temporarily deform to absorb a shock without deforming the perimeter defined by the traction bands 182 and 184. This is advantageous as it allows the track system 100 to provide a certain level of shock absorbency without having to provide a complex mechanism to maintain the tension in the traction bands 182 and 184 as the frame structure of the track system 100 temporarily deform.

In addition, by avoiding having the traction bands 182 and 184 wrapping around the first drive wheel 110, the overall lengths of the traction bands 182 and 184 are significantly shorter. Understandably, shorter traction bands 182 and 184 translates in lighter traction bands 182 and 184 as they require less band material, typically elastomeric material and reinforcing elements (e.g. cables, rods, fabrics, etc.). In addition, shorter traction bands will generally require less energy to displace them.

Referring now to FIGS. 3 and 8 to 11, the second drive wheels 150 further comprises a second drive gear 156. This second drive gear 156 is fixedly yet removably mounted to the same axle 158 (shown in two pieces in FIG. 9) as the second drive wheels 152 and 154 such that rotation of the second drive gear 156 will cause the rotation of the second drive wheels 152 and 154 and ultimately cause the displacement of the traction bands 182 and 184.

In the present embodiment, the second drive gear 156 is coupled to the first drive gear 114 via the transmission loop 122. Hence, when the first drive gear 114 is rotated via the rotation of the first drive wheel 110, the first drive gear 114 entrains and drives the transmission loop 122. Understandably, as the transmission chain 122 is entrained by the first drive gear 114, the transmission chain 122 entrains and drives the second drive gear 156, causing its rotation. As explained above, rotation of the second drive gear 156 will, in turn, causes the rotation of the second drive wheels 152 and 154 and the displacement of the traction bands 182 and 184.

In the present embodiment, the first drive gear 114 and the second drive gear 156 are fixedly yet removably mounted to their respective shaft 112 and axle 158. By allowing the first drive gear 114 and the second drive gear 156 to be removed, the present embodiment allows the installation, and removal, of first drive gear 114 and the second drive gear 156 providing different transmission ratios.

For instance, if the operator of the vehicle wishes to have a higher top speed, it could install a larger first drive gear 114 and a smaller second drive gear 156. Conversely, if it wishes to have a lower top speed but a higher torque, it could install a smaller larger first drive gear 114 and a larger second drive gear 156. Understandably, various combinations of first drive gear 114 and second drive gear 156 are possible. Different combinations of first drive gear 114 and second drive gear 156 could provide different trade-offs between speed and torque.

Notably though, by having the possibility to adjust the transmission ratio between the first drive gear 114 and the second drive gear 156, the top speed achievable by the vehicle 10 equipped with track systems 100 is no longer dependent on the size of the first drive wheel 110. In fact, the top speed achievable by the vehicle 10 equipped with track systems 100 would be dependent on the transmission ratio between the first drive gear 114 and the second drive gear 156.

Hence, the track system 100 in accordance with the principles of the present invention provides the benefits of track systems such as improved floatation and traction over soft terrains (e.g. sand, mud, snow, etc.) while avoiding the shortcomings of prior art track systems with respect to top speed limitation.

Referring to FIG. 3, to allow the transmission loop 122 to accommodate different sizes of first drive gear 114 and second drive gear 156, the first frame 120 comprises a loop tensioner 124. The tensioner 124 maintains a relatively constant tension in the transmission loop 122.

In the present embodiment, the tensioner 124 generally comprises an idler wheel 126 which pushes on the transmission loop 122 as best shown in FIG. 3. The position of the idler wheel 126 is adjustable with a push bolt 128. Understandably, other configurations of tensioners could be used.

In the present embodiment, the first frame 120 is generally formed or configured as a case such as to cover and protect the first drive gear 114, the second drive gear 156, and the transmission loop 122 from dirt, rocks and other debris.

Understandably, though the present embodiment of the track system 100 comprises a transmission loop 122 to transmit motive power from the first drive wheel 110 to the second drive wheels 150, other embodiments could comprise other and/or different mechanisms to transmit motive power from the first drive wheel 110 to the second drive wheels 150. For instance, in other embodiments, the transmission of power from the first drive wheel 110 to the second drive wheels 150 could be done via a friction drive belt or via a drive shaft.

In the present embodiment, the first frame 120 of the track system 100 is connected to the second frame 140 at one of the first and second extremities 141 and 143 thereof (see FIGS. 2 to 8). However, in other embodiments in accordance with the principles of the present invention, the first frame of the track system could be connected to the second track system at a location between the first and second extremities of the second frame.

Figure 16:
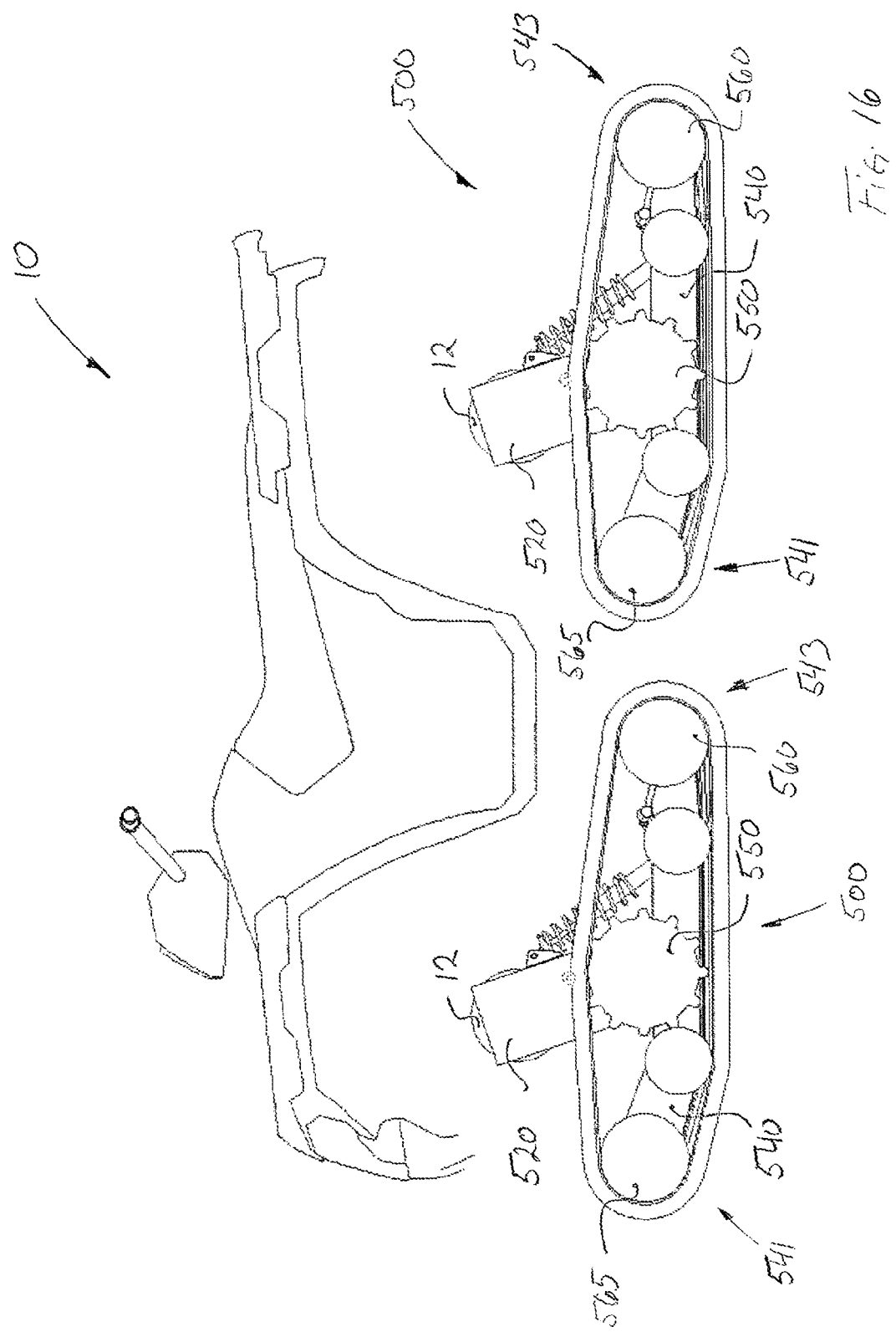
FIG. 16 is schematic side view of an exemplary vehicle shown with two track systems according to yet another embodiment in which the first frame is connected to the second frame at a location between the first and second extremities of the second frame.

For instance, in the track system 500 shown in FIG. 16, the first frame 520 is connected to the second frame 540 at a location longitudinally between the first extremity 541 and the second extremity 543 of the second frame 540.

In such embodiments, since the second drive wheels 550 would be located at a location longitudinally between the first extremity 541 and the second extremity 543 of the second frame 540, the track system 500 would further comprise front (or rear) idler wheels 565 in addition to the rear (of front) idler wheels 560.

Understandably, by using two drive wheels, a track system in accordance with the principles of the present invention generally needs a shorter traction band as the traction band does not need to wrap around the first drive wheel. Also, by using two drive wheels, a track system in accordance with the principles of the present invention generally provides a mechanism to adjust the top speed of the vehicle equipped with track systems.

Figure 17:
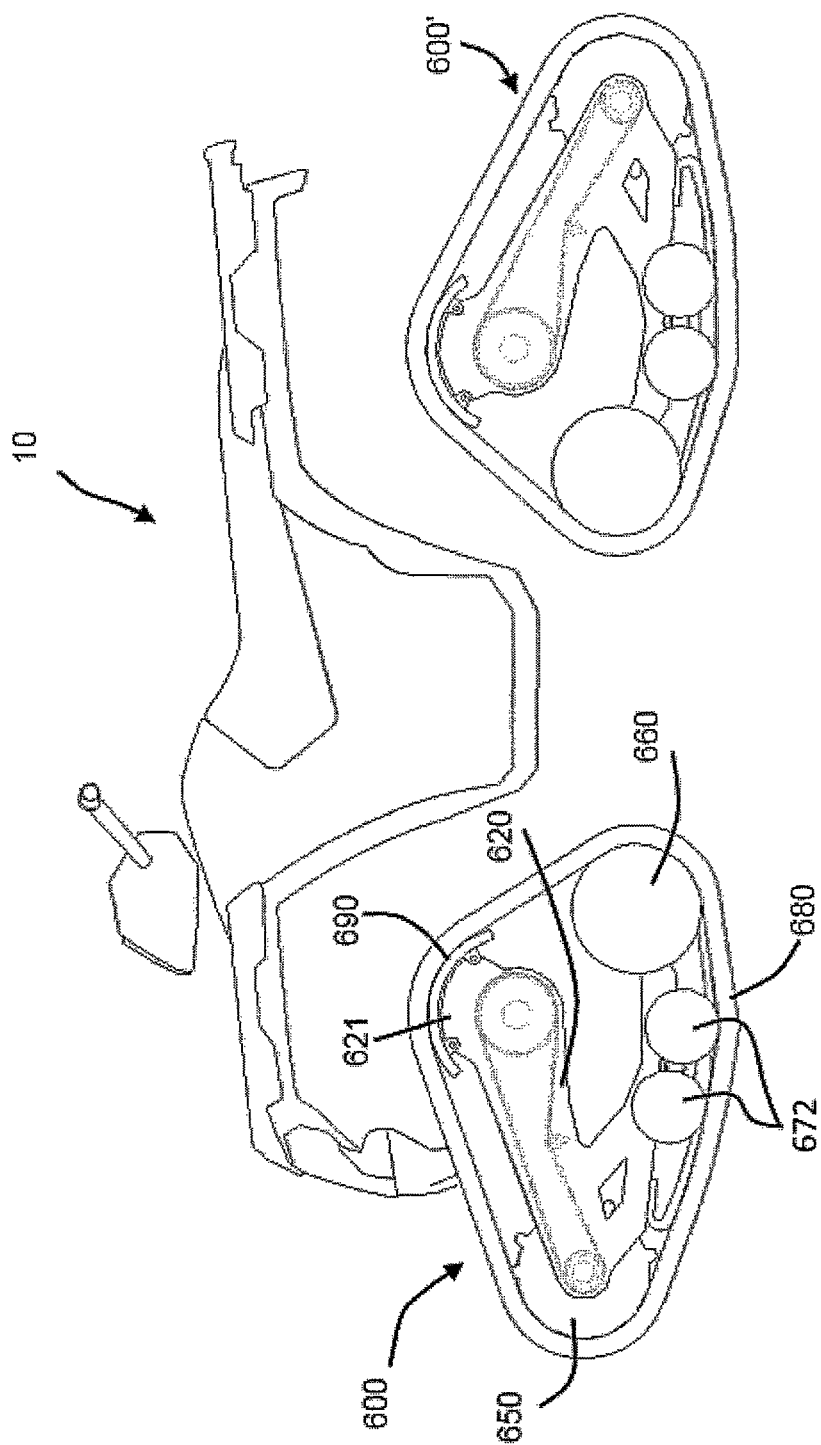
FIG. 17 is a schematic side view of an exemplary vehicle shown with two track systems according to yet another embodiment in accordance with the principles of the present invention in which the first and second portion of the frame are embodied in a single frame and comprise at least one guiding component located at the top extremity of the frame.

Now referring to FIGS. 17 and 18, exemplary vehicles having two track systems for which the first and second portion of the frame of each track system are embodied in a single frame are shown. Both embodiments allow the endless traction bands 680 or 780 to enclose, or envelop, a low-friction or frictionless component allowing the sliding, rotating, or any other alternative low-friction or frictionless movement. Such configurations typically ensure that the overall length of the endless traction bands 680 or 780 is shorter than existing prior art solutions.

Now referring to FIG. 17, an exemplary vehicle having two track systems for which the first and second portion of the frame of each track system are embodied in a single frame and each track system comprises at least one guiding component 690 located at the top extremity of the frame 620 is shown. In such an embodiment, the front track system 600 and the rear track system 600' each comprises a frame 620, an endless traction band 680, a drive wheel 650, an idler wheel 660, and at least one guiding component 690 on which the endless traction band 680 slidingly engages. Each track system 600 or 600' may further comprise support wheels 672 (or road or rolling wheels) located between the drive wheel 650 and the idler wheel 660.

Typically, the at least one guiding component 690 shall be made with material having a minimal friction coefficient when engaging the endless traction band 680 while being durable. The at least one guiding component 690 is typically mounted to the frame 620 and is typically embodied as a slider. Accordingly the traction band 680 generates an enclosed area enveloping the sliding component 690, the drive wheel 650 and the idler wheel 660.

The sliding component 690 is typically attached, but not limitatively, to the top extremity 621 of the frame 620 to generally form, in combination with the second drive wheel 650 and the idler wheel 660, a relatively flattened triangular perimeter forming driving course for the traction band 680.

Furthermore, the present embodiment illustrated on FIG. 17 may feature a first portion of the frame 620 (the drive frame portion) and a second portion of the frame 620 (the carriage frame portion) embodied as a single c-shaped frame 620. The transmission loop 122, as described in relation with the embodiments illustrated through FIGS. 1 to 17, is typically enclosed in the first portion of the frame 620 drivingly connecting the first drive wheel to the second drive wheel 650.

Now referring to FIG. 18, an exemplary vehicle comprising two track systems according to yet another embodiment in accordance with the principles of the present invention in which the first and second portion of the drive frame are embodied in a single frame and a guiding wheel is mounted on the frame is shown. The front and rear track systems 700 and 700' of this embodiment comprises the endless traction band 780 also enclosing the first drive wheel. The present embodiment involves a third wheel 790 (or a guiding wheel or a free wheel) rotatively attached to the top extremity 721 of the frame 720 to rotatively engages with the endless traction band 780. The present configuration allows the traction band 780 to rotate around portions of the third wheel 790, the second drive wheel 750 and the idler wheel 760. In such an embodiment, the guiding wheel 790 may comprise one or more bearings 792 allowing the friction between the endless traction band 780 and the wheel 790 to be optimally reduced. As illustrated, but not limitatively, the guiding wheel 790 may be pivotally mounted on the top extremity 721 of the frame 720. The bearings 792, or alternatives friction reducing mean, allow the guiding wheel 790 to freely rotate around its axis as the traction band 780 generally moves according to rotations of the second drive wheel 750.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system to be mounted on a vehicle having a rotatable wheel hub structured for mechanical attachment of a ground-engaging wheel thereto, comprising:

a first drive wheel assembly structured to be mechanically attached to the rotatable wheel hub of the vehicle when the ground-engaging wheel is removed;
a first frame pivotally mounted on the first drive wheel assembly;
a second drive wheel assembly rotatably attached to the first frame;
a transmission operatively interconnecting the first drive wheel assembly with the second drive wheel assembly, rotation of the first drive wheel assembly causing rotation of the second drive wheel assembly;
a second frame attached to the first frame;
at least one idler wheel, the at least one idler wheel and the second drive wheel assembly being rotatably attached to the second frame; and
an endless traction band disposed about the second drive wheel assembly and the at least one idler wheel, the endless traction band being drivingly engaged by the second drive wheel assembly, whereby rotation of the second drive wheel assembly drives the endless traction band;

wherein:
the first drive wheel assembly has a rotatable extending shaft, rotation of the wheel hub causing rotation of the rotatable extending shaft;
a first drive gear is mounted on the rotatable extending shaft, rotation of the rotatable extending shaft causing rotation of the first drive gear;
the second drive wheel assembly is rotatably attached to the first frame via a rotatable axle;
a second drive gear is mounted on the axle, rotation of the second drive gear causing rotation of the second drive wheel assembly via rotation of the axle; and
the transmission interconnects the first drive gear with the second drive gear, rotation of the first drive gear causing rotation of the second drive gear via the transmission; and
the second frame is attached to the first frame via the second frame being pivotably mounted on the axle.

2. The track system of claim 1, wherein the transmission is housed by the first frame.

3. The track system of claim 1, wherein the second frame is pivotally connected to the first frame at a pivot point.

4. The track system of claim 3, wherein a suspension component is pivotally connected to the first frame and to the second frame.

5. The track system of claim 1, wherein the second drive wheel assembly is disposed at an extremity of the second frame.

6. The track system of claim 1, wherein the endless traction band forms a closed area enveloping the second drive wheel assembly and the at least one idler wheel.

7. The track system of claim 6, wherein the first drive wheel assembly is located outside of the closed area.

8. The track system of claim 1, further comprising a guiding component, the guiding component slidingly engaging the endless traction band.

9. The track system of claim 8, wherein the guiding component is attached to the first frame.

10. The track system of claim 1, further comprising a free wheel pivotally mounted to the first frame.

11. The track system of claim 1, further comprising at least one support wheel rotatably attached to the frame, the at least one support wheel being disposed between the second drive wheel assembly and the at least one idler wheel.

12. The track system of claim 1, wherein the first frame and the second frame are fixedly attached to one another.

13. The track system of claim 1, wherein the endless traction band is inwardly mounted relatively to the first frame with respect to the vehicle.

14. The track system of claim 1, wherein the endless traction band is outwardly mounted relatively to the first frame with respect to the vehicle.

15. The track system of claim 1, wherein the endless traction band is composed of an inward traction band and an outward traction band disposed inwardly and outwardly relatively to the first frame.

16. The track system of claim 1, wherein the rotatable wheel hub of the vehicle is pivotable with respect to the vehicle to steer the vehicle, and wherein the first drive wheel assembly, the second drive wheel assembly, the transmission and the first frame all pivot together with respect to the vehicle with the rotatable wheel hub.

17. The track system of claim 1, wherein the first frame and the second frame are unitary.

\* \* \* \* \*